(12) United States Patent
Yashiro et al.

(10) Patent No.: US 10,648,402 B2
(45) Date of Patent: May 12, 2020

(54) SUPERCHARGING SYSTEM, CONTROL DEVICE FOR SUPERCHARGING SYSTEM, CONTROL METHOD FOR SUPERCHARGING SYSTEM, AND PROGRAM

(71) Applicant: MITSUBISHI HEAVY INDUSTRIES ENGINE & TURBOCHARGER, LTD., Sagamihara-shi, Kanagawa (JP)

(72) Inventors: Yusuke Yashiro, Tokyo (JP); Yoshihiro Hayashi, Tokyo (JP); Byeongil An, Tokyo (JP); Yuuji Wakai, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 27 days.

(21) Appl. No.: 16/079,847

(22) PCT Filed: Mar. 7, 2016

(86) PCT No.: PCT/JP2016/056960
§ 371 (c)(1),
(2) Date: Aug. 24, 2018

(87) PCT Pub. No.: WO2017/154068
PCT Pub. Date: Sep. 14, 2017

(65) Prior Publication Data
US 2019/0072028 A1    Mar. 7, 2019

(51) Int. Cl.
*F02B 37/04* (2006.01)
*F02B 37/16* (2006.01)
(Continued)

(52) U.S. Cl.
CPC .............. *F02B 37/04* (2013.01); *F02B 33/34* (2013.01); *F02B 37/16* (2013.01); *F02B 37/162* (2019.05);
(Continued)

(58) Field of Classification Search
CPC .......... F02B 33/34; F02B 37/04; F02B 37/16; F02B 37/162; F02B 37/24; F02B 39/10;
(Continued)

(56) References Cited

U.S. PATENT DOCUMENTS

| | | | |
|---|---|---|---|
| 6,062,026 A * | 5/2000 | Woollenweber | F02B 37/04 60/605.2 |
| 6,920,756 B2 | 7/2005 | Hoecker et al. | |

(Continued)

FOREIGN PATENT DOCUMENTS

| | | |
|---|---|---|
| DE | 10 2006 000 075 A1 | 9/2006 |
| DE | 10 2010 027 220 A1 | 1/2012 |

(Continued)

OTHER PUBLICATIONS

JP2005061243 Translation, 2005 Mishima.*
(Continued)

*Primary Examiner* — Jesse S Bogue
(74) *Attorney, Agent, or Firm* — Birch, Stewart, Kolasch & Birch, LLP

(57) ABSTRACT

This control device starts an electric motor on the basis of a drive signal. After starting of the electric motor, the control device switches a bypass valve from an open state to a closed state.

14 Claims, 12 Drawing Sheets

(51) Int. Cl.
*F02B 39/10* (2006.01)
*F02D 41/00* (2006.01)
*F02B 33/34* (2006.01)
*F02D 41/04* (2006.01)
*F02B 37/24* (2006.01)

(52) U.S. Cl.
CPC .............. *F02B 37/24* (2013.01); *F02B 39/10* (2013.01); *F02D 41/0007* (2013.01); *F02D 41/04* (2013.01); *F02D 2200/0406* (2013.01); *Y02T 10/144* (2013.01)

(58) Field of Classification Search
CPC ......... F02D 2200/0406; F02D 41/0007; F02D 41/04; Y02T 10/144
See application file for complete search history.

(56) References Cited

U.S. PATENT DOCUMENTS

| | | | | |
|---|---|---|---|---|
| 6,938,420 | B2* | 9/2005 | Kawamura | F02B 33/34 60/612 |
| 7,530,229 | B2* | 5/2009 | Akita | F02B 37/22 290/52 |
| 7,644,586 | B2* | 1/2010 | Yamagata | F02D 23/00 123/561 |
| 9,010,114 | B2* | 4/2015 | Krug | F02B 29/0412 60/607 |
| 2016/0061102 | A1* | 3/2016 | Sugiyama | F02B 37/04 60/611 |
| 2016/0061104 | A1* | 3/2016 | Hirayama | F02D 41/12 60/602 |
| 2016/0265468 | A1 | 9/2016 | Takayanagi et al. | |
| 2017/0145906 | A1* | 5/2017 | Tomita | F02D 41/18 |

FOREIGN PATENT DOCUMENTS

| | | |
|---|---|---|
| EP | 2 767 701 A1 | 8/2014 |
| JP | 2005-61243 A | 3/2005 |
| JP | 2006-57548 A | 3/2006 |
| JP | 2007-92683 A | 4/2007 |
| JP | 2015-108329 A | 6/2015 |
| WO | WO 2016/002964 A1 | 1/2016 |

OTHER PUBLICATIONS

International Search Report dated May 31, 2016 in counterpart PCT Application No. PCT/JP2016/056960 with an English Translation.
Written Opinion dated May 31, 2016 in counterpart PCT Application No. PCT/JP2016/056960 with an English Translation.

* cited by examiner

SUPERCHARGING SYSTEM, CONTROL DEVICE FOR SUPERCHARGING SYSTEM, CONTROL METHOD FOR SUPERCHARGING SYSTEM, AND PROGRAM

TECHNICAL FIELD

The present invention relates a turbocharging system, a control device tor a turbocharging system, a control method for a turbocharging system, and a program.

BACKGROUND ART

Efficiency of a turbocharger depends on energy that a turbine receives from exhaust air. Therefore, effects of the turbocharger are small in a low rotation region where the amount of exhaust air from an engine is small. Accordingly, a turbocharging system has been studied, in which a turbocharger and an electric compressor are provided in an air supply path and turbocharging can be performed even in a case where the amount of the exhaust air is small (refer to PTL 1).

CITATION LIST

Patent Literature

[PTL 1] U.S. Pat. No. 6,920,756

SUMMARY OF INVENTION

Technical Problem

In a case where the electric compressor is operated in the above-described turbocharging system, a valve is operated to switch a flow path such that air flows through the electric compressor. However, if the flow path is switched when a rotation speed of the electric compressor is low, a flow of the air is obstructed by the electric compressor, and thus, a supply air pressure may decrease.

An object of the present invention is to provide a turbocharging system, a control device for a turbocharging system, a control method for a turbocharging system, and a program capable of preventing a flow of air from being obstructed by the electric compressor.

Solution to Problem

According to a first aspect of the present invention, there is provided a control device for a turbocharging system including a first compressor which is provided in an intake flow path through which intake air supplied to an engine flows and is driven to compress the intake air, an electric motor which drives the first compressor, a second compressor which is provided in the intake flow path independently of the first compressor and compresses the intake air, a turbine which is provided in an exhaust system through which exhaust air from the engine flows and is rotated by the exhaust air so as to drive the second compressor, a bypass flow path which is connected to the intake flow path and bypasses the first compressor, and an on-off Valve which opens or closes the bypass flow path, the control device including: an electric motor control unit which starts the electric motor based on a drive signal; and a valve control unit which switches the on-off valve from an open state to a closed state after the electric motor is started by the electric motor control unit.

According to a second aspect of the present invention, in the control device of the turbocharging system according to the first aspect, the control device may further include a first acquisition unit which acquires a physical quantity relating to a rotation of the first compressor, in which the valve control unit may switch the on-off valve from the open state to the closed state after the electric motor starts and in a case where the physical quantity acquired by the first acquisition unfit exceeds a predetermined threshold value.

According to a third aspect of the present invention, in the control device of the turbocharging system according to the first or second aspect, the control device may further include a second acquisition unit which acquires a physical quantity relating to a rotation of the second compressor, in which the electric motor control unit may stop the electric motor in a case where the physical quantity acquired by the second acquisition unit exceeds a predetermined threshold value, and the valve control unit may switch the on-off valve from the closed state to the open state at a speed corresponding to a rotation speed of the electric motor.

According to a fourth aspect of the present invention, in the control device of the turbocharging system according to the third aspect, the control device may further include a command receiving unit which receives an interrupt command for stopping the electric motor, in which the electric motor control unit may stop the electric motor in a case where the command receiving unit receives the interrupt command, and a time from when a stop at the electric motor starts until the electric motor stops based on the interrupt command may be shorter than a time from when the stop of the electric motor starts until the electric motor stop based on the physical quantity.

According to a fifth aspect of the present invention, in the control device of the turbocharging system according to any one of the first to fourth aspects, the turbine may be configured to be able to open or close a nozzle vane, a turbine control unit which controls opening or closing of the nozzle vane may be further provided, and the electric motor control unit may start the electric motor when the turbine control unit closes the nozzle vane.

According to a sixth aspect of the prevent invention, there is provided a turbocharging system including: a first compressor which is provided in an intake flow path through which intake air supplied to an engine flows and is driven to compress the intake air; an electric motor which drives the first compressor; a second compressor which is provided in the intake flow path independently of the first compressor and compresses the intake air; a turbine which is provided in an exhaust system through which exhaust air from the engine flows and is rotated by the exhaust air so as to drive the second compressor; a bypass flow path which is connected to the intake flow path and bypasses the first compressor; an on-off valve which opens or closes the bypass flow path; and the control device according to any one of the first to fifth aspects.

According to a seventh aspect of the present invention, there is provided an engine system including: an engine; and the turbocharging system according to the sixth aspect.

According to an eighth aspect of the present invention, there is provided a control method for a turbocharging system including a first compressor which is provided in an intake flow path through which intake air supplied to an engine flows and is driven to compress the intake air, an electric motor which drives the first compressor, a second compressor which is provided in the intake flow path independently of the first compressor and compresses the intake air, a turbine which is provided in an exhaust system through which exhaust air from the engine flows and is rotated by the exhaust air so as to drive the second compressor, a bypass flow path which is connected to the intake flow path and bypasses the first compressor, and an on-off valve which opens or closes the bypass flow path, the control method including: starting an operation of the electric motor based on a drive signal; and switching the on-off valve from an open state to a closed state after the electric motor starts.

According to a ninth aspect of the present invention, there is provided a program for causing a computer of a control device for a turbocharging system including a first compressor which is provided in an intake flow path through which intake air supplied to an engine flows and is driven to compress the intake air, an electric motor which drives the first compressor, a second compressor which is provided in the intake flow path independently of the first compressor and compresses the intake air, a turbine which is provided in an exhaust system through which exhaust air from the engine flows and is rotated by the exhaust air so as to drive the second compressor, a bypass flow path which is connected to the intake flow path and bypasses the first compressor, and an on-off valve which opens or closes the bypass flow path, to execute: starting an operation of the electric motor based on a drive signal; and switching the on-off valve from an open state to a closed state after the electric motor starts.

Advantageous Effects of Invention

According to at least one aspect of the above-described aspects, the on-off valve is switched from the open state to the closed state after the electric motor starts. Accordingly, when air flowing through the air supply flow path passes through the first compressor, the first compressor is rotated in advance, and thus, the supply air pressure of the turbocharging system can be prevented from decreasing.

DESCRIPTION OF EMBODIMENTS

First Embodiment

Figure 1:
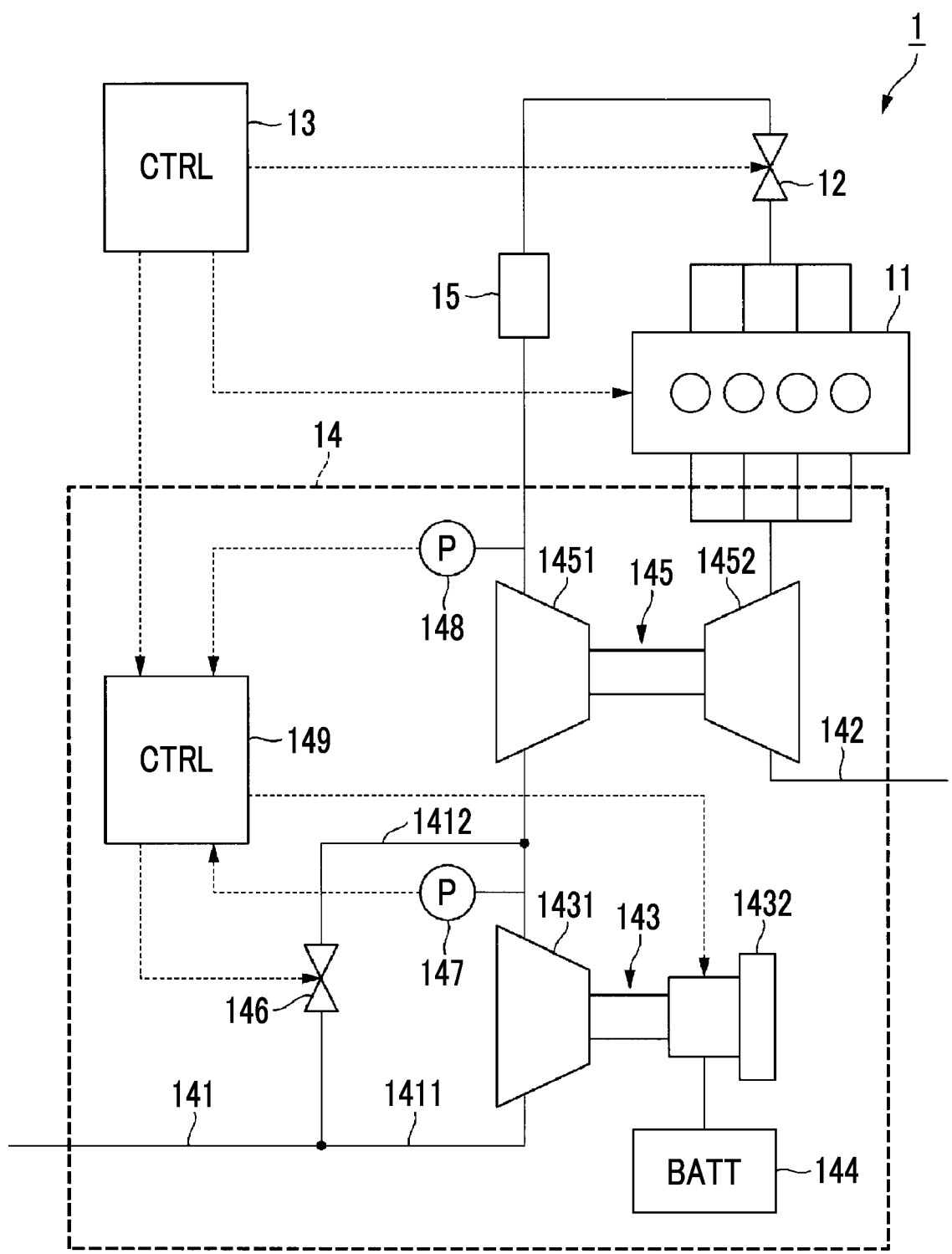
FIG. 1 is a schematic configuration diagram of an engine system according to a first embodiment.

Hereinafter, embodiments will be described in detail with reference to the drawings.
FIG. 1 is a schematic configuration diagram of an engine system according to a first embodiment.
The engine system includes an engine 11, a throttle valve 12, an engine controller 13, a turbocharging system 14, and an intercooler 15.
Examples of the engine 11 include a gasoline engine and a diesel engine.
The throttle valve 12 is a valve which controls a flow rate of intake air supplied to the engine 11. Based on an engine control signal including a rotation speed and a load, the engine controller 13 performs adjustment of a fuel injection amount of the engine 11, adjustment of an opening degree of the throttle valve 12, and other controls. The engine controller 13 outputs a turbocharging control signal to the turbocharging system 14. The turbocharging control signal is a signal including the rotation speed, the fuel injection amount, an exhaust amount, and a target turbocharging amount of the engine 11.
The turbocharging system 14 s a system which increases a density of the intake air of the engine 11 to obtain high combustion energy.
The intercooler 15 cools the intake air compressed by the turbocharging system 14.
The turbocharging system 14 according to the first embodiment includes an intake flow path. 141, an exhaust flow path 142, an electric compressor 143, a battery 144, a turbocharger 145, a bypass valve 146 (on-off valve), a first pressure sensor 147, a second pressure sensor 148, and a turbo controller 149.
The intake flow path 141 is a pipe through which the intake air flows to the engine 11. The intake flow path 141 including a main intake flow path 1411 passing through the turbocharger 145 and the electric compressor 143 and a bypass flow path 1412 passing through the turbocharger 145 without passing through the electric compressor 143.
The exhaust flow path 142 is a pipe through which the exhaust air flows from the engine 11.
The electric compressor 143 a device which compresses the intake air of the engine 11 by electricity supplied from the battery 144. The electric compressor 143 includes a compressor 1431 (first compressor) and an electric motor 1432. The compressor 1431 is provided in the main intake flow path 1411 of the intake flow path 141. The compressor 1431 is rotated to compress the intake air. The electric motor 1432 receives the supply of electricity from the battery 144 so as to be driven. The electric motor 1432 and the compressor 1431 are rotated by a common shaft. Accordingly, the electric motor 1432 drives the compressor 1431.
The turbocharger 145 is a device which compresses the intake air of the engine 11 by the exhaust air of the engine 11. The turbocharger 145 includes a compressor 1451 (second compressor) and a turbine 1452. The compressor 1451 is provided in the intake flow path 141 of the engine 11. The compressor 1451 is rotated to compress the intake air. The turbine 1452 is provided in the exhaust flow path 142 of the engine 11. The turbine 1452 and the compressor 1451 are rotated by a common shaft. Accordingly, the turbine 1452 is rotated by the exhaust air to drive the compressor 1451.

The bypass valve 146 is provided in the bypass flow path 1412 in the intake flow path 141. If the bypass valve 146 is opened, a flow rate of the intake air passing through the electric compressor 143 decreases. If the bypass valve 146 is closed, the flow rate of the intake air passing through the electric compressor 143 increases. An opening degree of the bypass valve 146 when the electric compressor 143 is not operated is 100%.

The first pressure sensor 147 measures an outlet pressure of the electric compressor 143 (compressor 1431).

The second pressure sensor 148 measures an outlet pressure of the turbocharger 145 (compressor 1451).

Based on the turbocharging control signal input from the engine controller 13, the turbo controller 149 controls het electric compressor 143 and the bypass valve 146. The turbo controller 149 is an example of the control device of the turbocharging system.

Figure 2:
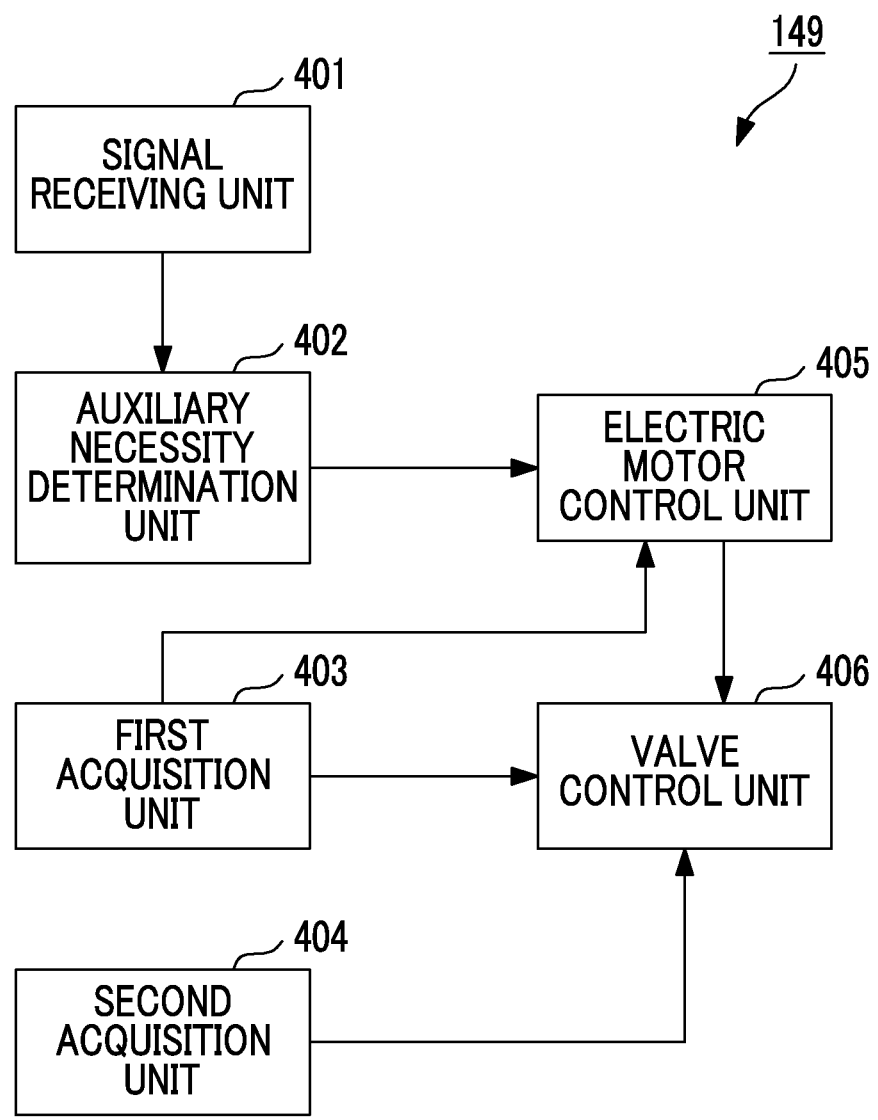
FIG. 2 is a schematic block diagram showing a software configuration of a turbo controller according to the first embodiment.

FIG. 2 is a schematic block diagram showing a software configuration of a turbo controller according to the first embodiment.

The turbo controller 149 includes a signal receiving unit 401, an auxiliary necessity determination unit 402, a first acquisition unit 403, a second acquisition unit 404, an electric motor control unit 405, and a valve control unit 406.

The signal receiving unit 401 receives the turbocharging control signal from the engine controller 13.

Based on the turbocharging control signal received by the signal receiving unit 401, the auxiliary necessity determination unit 402 determines whether or not assistance of turbocharging by the electric compressor 143 is necessary.

The first acquisition unit 403 acquires a sensor signal indicating an outlet pressure of the electric compressor 143 from. the first pressure sensor 147.

The second acquisition unit 404 acquires a sensor signal indicating an outlet pressure of the turbocharger 145 from the second pressure sensor 148.

Based on the turbocharging control signal received by the signal receiving unit 401 and the sensor signal acquired by the second acquisition unit 404, the electric motor control unit 405 controls the rotation speed of the electric motor 1432.

Based on the sensor signal acquired by the first acquisition unit 403, the valve control unit 406 controls the opening degree of the bypass valve 146.

Figure 3:
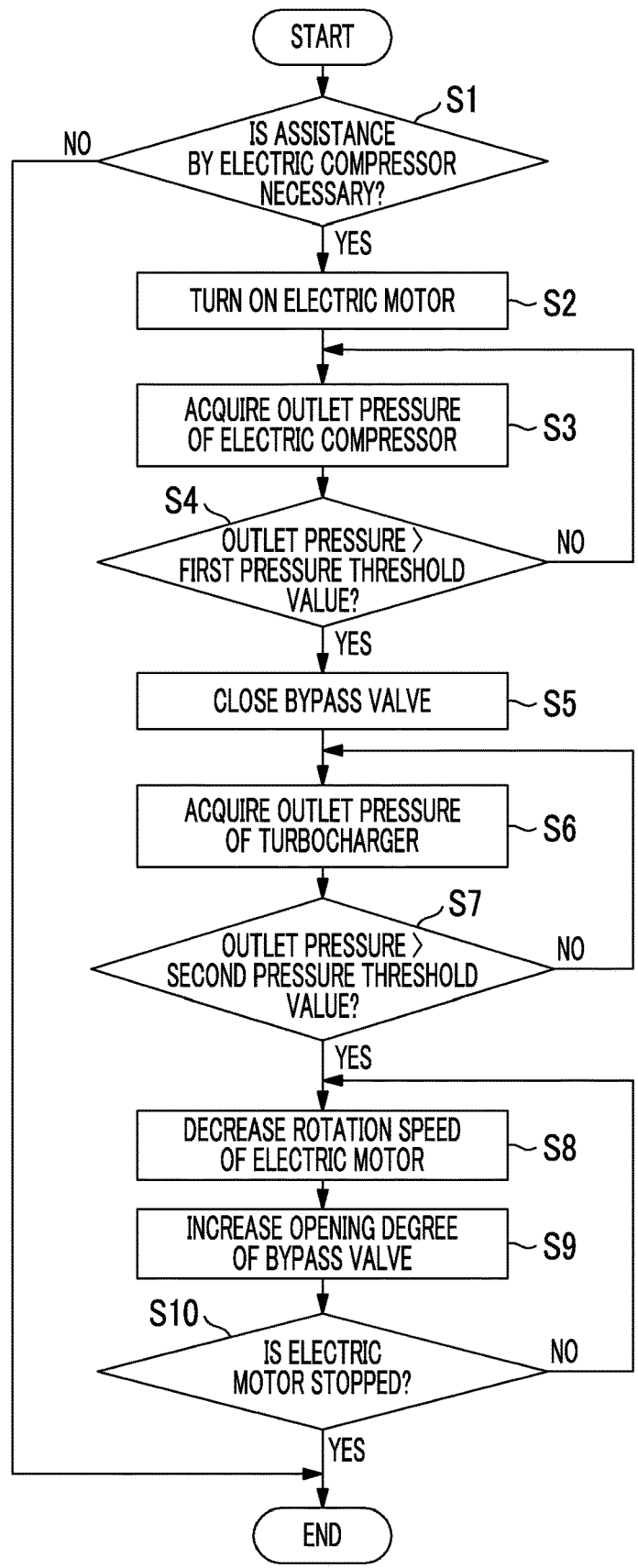
FIG. 3 is a flowchart showing a control operation of an electric compressor by the turbo controller according to the first embodiment.

FIG. 3 is a flowchart showing a control operation of the electric compressor by the turbo controller according to the first embodiment.

If the signal receiving unit 401 of the turbo controller 149 receives the turbocharging control signal from the engine controller 13, based on the exhaust amount and the target turbocharging amount of the engine 11 included in the turbocharging control signal, the auxiliary necessity determination unit 402 determines whether or riot the assistance by the electric compressor 14.3 is necessary (Step S1). For example, based on the exhaust amount, the auxiliary necessity determination unit 402 predicts the turbocharging amount by the turbocharger 145, and in a case where the predicted turbocharging amount is less than the target turbocharging amount, the auxiliary necessity determination unit 402 determines that the assistance by the electric compressor 143 is necessary. In a case where the auxiliary necessity determination unit 402 determines that the assistance by the electric compress 143 is not necessary (Step S1: NO), the turbo controller 149 completes the processing without driving the electric compressor 143.

Meanwhile, in a case where the auxiliary necessity determination unit 402 determines that the assistance by the electric compressor 143 is necessary (Step S1: YES), the electric motor control unit 405 starts supply of electricity from the battery 144 to the electric motor 1432. Accordingly, the electric motor 1432 starts (Step S2). After the electric motor 1432 starts, the rotation speed of the electric motor 1432 gradually increases to reach a target rotation speed. That is, the rotation speed of the electric motor 1432 immediately after electric motor 1432 starts does not reach the target rotation speed.

The first acquisition unit 403 acquires the sensor signal indicating the outlet pressure of the electric compressor 143 from the first pressure sensor 147 (Step S3). The valve control unit 406 determines whether or not the outlet pressure indicated by the sensor signal acquired by the first acquisition unit 403 exceeds a first pressure threshold value (Step S4). The first pressure threshold value corresponds to an outlet pressure of the electric compressor 143 when the rotation speed of the electric compressor 143 exceeds a predetermined speed and air having a sufficient flow rate flows to the main intake flow path 1411 by the electric compressor 143. The first pressure threshold value is a value obtained by experiment or simulation advance. In a case where the outlet pressure of the electric compressor 143 is equal to or less than. the first pressure threshold value (Step S4: NO), the turbo controller 149 returns the processing to Step S3, and thus, the sensor signal is acquired again.

Meanwhile, in a case where the outlet pressure of the electric compressor 143 exceeds the first pressure threshold value (Step S4: YES), the valve control unit 406 closes the bypass valve 146 (Step S5). That is, the valve control unit 406 changes the opening degree of the bypass valve 146 to 0%. Accordingly, the intake air flows into the turbocharger 145 through the main intake flow path 1411 without passing through the bypass flow path 1412. Accordingly, the electric compressor 143 starts the assistance of the turbocharging. In this way, the valve control unit 406 switches the bypass valve 146 from an open state to a closed state after the electric motor 1432 is started by the electric motor control unit 405.

If the electric compressor 143 starts the assistance in trio compression of the intake air, the second acquisition unit 404 acquires the sensor signal indicating the outlet pressure of the turbocharger 145 from the second pressure sensor 148 (Step S6). The electric motor control unit 405 determines whether or not the cutlet pressure indicated by the sensor signal acquired by the second. acquisition unit 404 exceeds a second pressure threshold value (Step S7). The second pressure threshold value corresponds to an outlet pressure of the turbocharger 145 when the rotation speed the turbocharger 145 exceeds a predetermined speed and the assistance of the turbocharging by the electric compressor 143 is not necessary. The second pressure threshold value is a value obtained by experiment or simulation in advance. In a case where the outlet pressure of the turbocharger 145 is equal to or less than the second pressure threshold value (Step S7: NO) , the turbo controller 149 returns the processing to Step S5, and thus, the sensor signal is acquired again.

Meanwhile, in a case where the outlet pressure of the turbocharger 145 exceeds the second pressure threshold value (Step S7: YES), the electric motor central unit 405 decreases the rotation speed of the electric motor 1432 to a predetermined speed (Step S8). The valve control unit 406 increases the opening degree of the bypass valve 146 by a predetermined amount (Step S9). In this case, the valve control unit 406 increases the opening degree of the bypass valve 146 by an opening degree corresponding to a decrease of the rotation speed with respect to the target rotation speed of the electric motor 1432. For example, in a case where the electric motor control unit 405 decreases the rotation speed by 5% with respect to the target rotation speed of the electric motor 1432 under the control of Step S2, the valve control unit 406 increases the opening degree of the bypass valve 146 by 5%. The electric motor control unit 405 determines whether or not the electric motor 1432 is stopped (Step S10). In a case where the electric motor 1432 is not stopped (Step S10: NO), the turbo controller 149 returns the processing to Step S8 so as to decrease the rotation speed of the electric motor 1432 and increase the opening degree of the bypass valve 146. Accordingly, when the rotation of the electric motor 1432 is stopped, the opening degree of the bypass valve 146 becomes 100%. in a case where the electric motor 1432 is stopped (Step S10: YES), the turbo controller 149 completes the control operation of the electric compressor 143.

Here, an effect of the turbocharging system 14 according to the first embodiment will be described with reference to a specific example.

Figure 4:
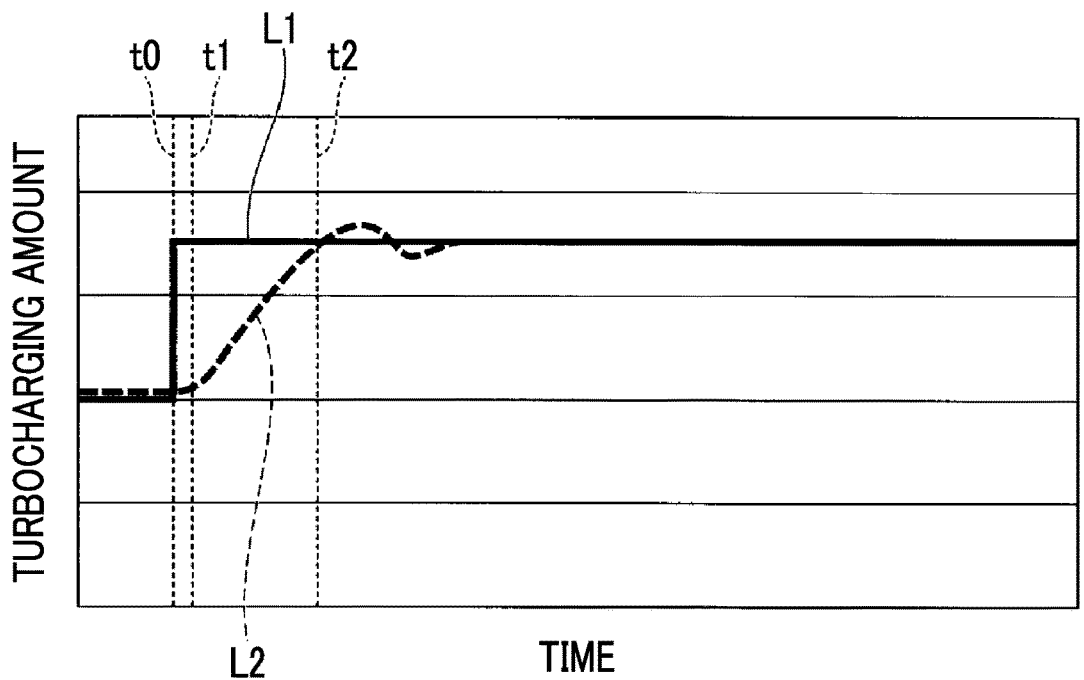
FIG. 4 is a graph showing a relationship between a target turbocharging amount included in a turbocharging control signal and a turbocharging amount by a turbocharging system.

FIG. 4 is a graph showing a relationship between the target turbocharging amount included in the turbocharging control signal and the turbocharging amount by a turbocharging system. In FIG. 4, a line L1 indicates the target turbocharging amount. A line L2 indicates the turbocharging amount of the turbocharging system 14.

Figure 5:
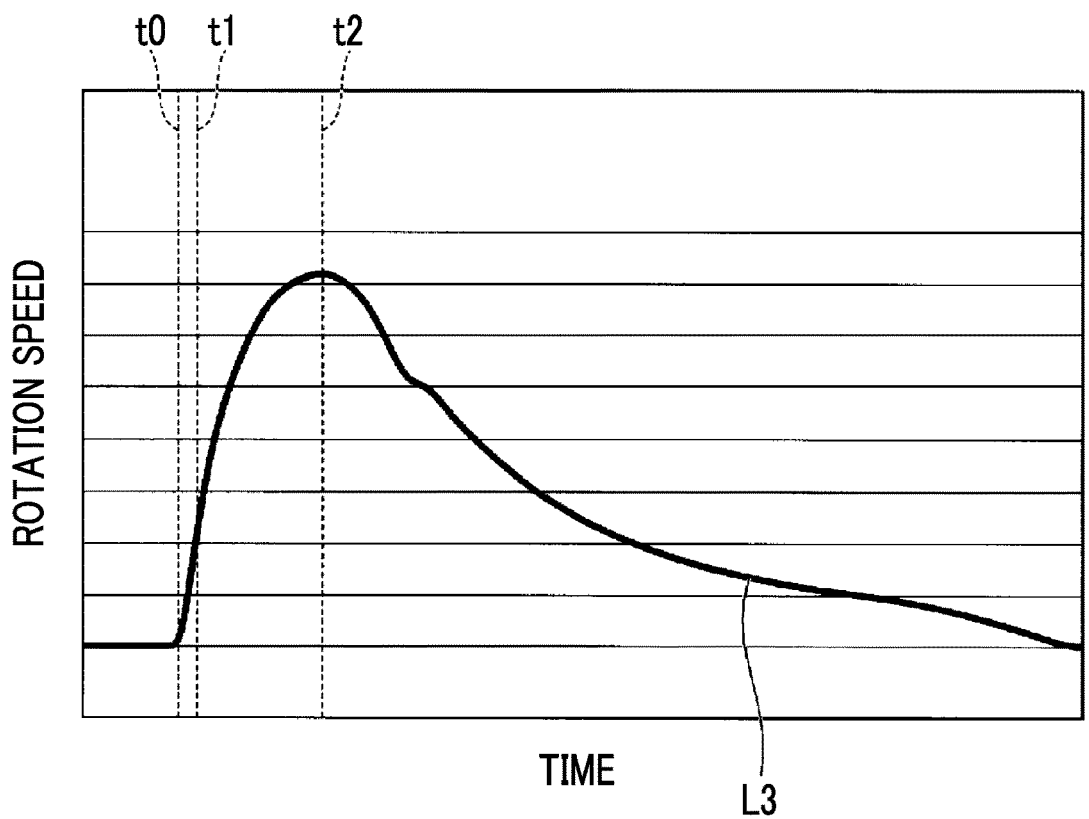
FIG. 5 is a graph showing a temporal change of a rotation speed of the electric compressor.

FIG. 5 is a graph showing a temporal change of the rotation speed of the electric compressor. In FIG. 5, a line L3 indicates the rotation speed of the electric compressor 143.

Figure 6:
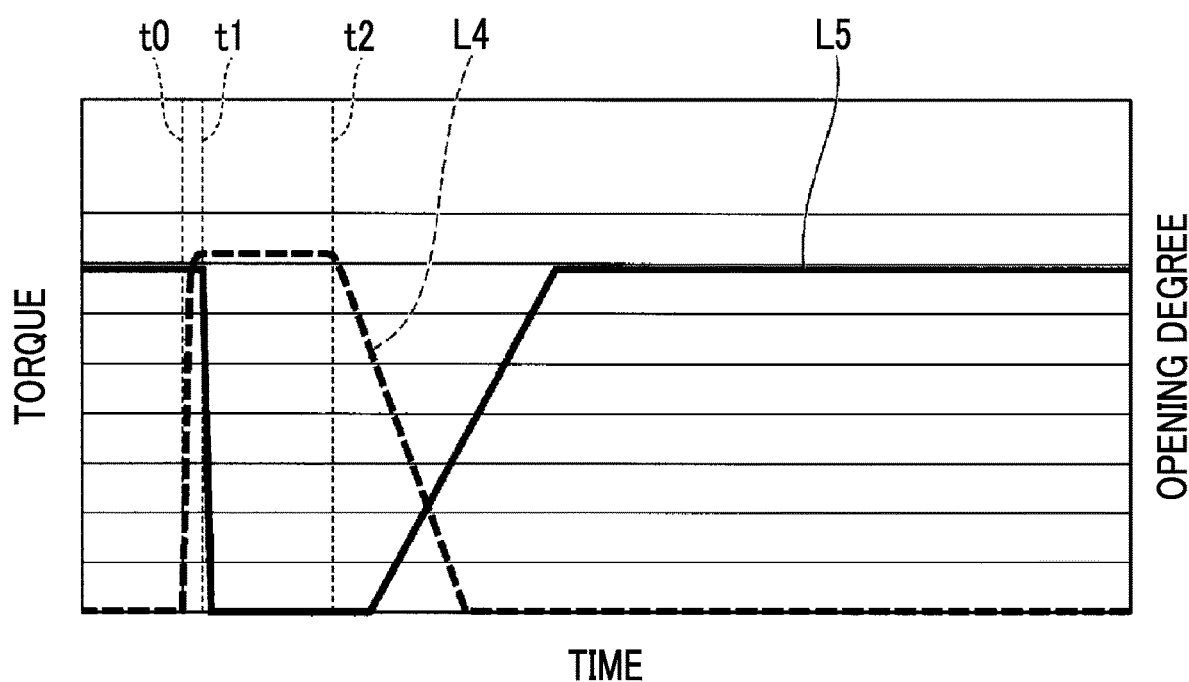
FIG. 6 is a graph showing a relationship between torque of an electric motor and an opening degree of a bypass valve.

FIG. 6 a graph showing a relationship between torque of the electric moor and the opening degree of the bypass valve. In FIG. 6, a line L4 indicates the torque of the electric motor 1432. A line L5 indicates the opening degree of the bypass valve 146.

Referring to FIGS. 4, 5, and 6, the turbo controller 149 receives a turbocharging control signal increasing the turbocharging amount at a time t0. The torque of the electric motor 1432 reaches a constant value at a time t1. The turbocharging amount by the turbocharging system 14 reaches the target turbocharging amount at a time t2.

The turbo controller 149 determines that the assistance by the electric compressor 143 is necessary at the time t0 and starts the electric motor 1432. As shown in FIG. 6, the torque and the rotation speed of the electric motor 1432 gradually increase from the time t0 to the time t1. When the time reaches the time t1, the outlet pressure of the electric compressor 143 exceeds the first pressure threshold value. The turbo controller 149 closes the bypass valve 146 at the time t1. Accordingly, in order to start the assistance of the turbocharging by the electric compressor 143, as shown in FIG. 4, the turbocharging amount of the turbocharging system 14 increases. At the time t2, the turbocharging amount by the turbocharging system 14 reaches the target turbocharging amount. At this time, the outlet pressure of the turbocharger 145 reaches the second pressure threshold value. At the time t2, as shown in FIG. 5, the turbo controller 149 gradually decreases the rotation speed of the electric motor 1432 and gradually increases the opening degree of the bypass valve 146. Accordingly, as shown in FIG. 4, the turbo controller 149 can perform the control such that the turbocharging amount of the turbocharging system 14 becomes the target turbocharging amount.

In this way, according to the first embodiment, after the electric motor 1432 is started by the electric motor control unit 405, the valve control unit 406 switches the bypass valve 146 from the open state to the closed state. Accordingly, the valve control unit 406 can prevent the supply air pressure immediately after the electric motor 1432 starts from decreasing. Particularly, according to the first embodiment, in a case where the outlet pressure of the electric compressor 143 exceeds the first pressure threshold value, the valve control unit 406 switches the bypass valve 146 from the open state to the closed state. Accordingly, after the rotation speed of the electric motor 1432 reliably reaches a constant value, the valve control unit 406 can close the bypass valve 146.

According to the first embodiment, in the case where the outlet pressure of the turbocharger 145 exceeds the second pressure threshold value, the turbo controller 149 gradually decreases the speed of the electric motor 1432 and switches the bypass valve 146 from the closed state to the open state at a speed corresponding to the rotation speed of the electric motor 1432. In this way, the speed of the electric motor 1432 and the opening degree of the bypass valve 146 are gradually changed, and thus, it is possible to decrease influence of a resistance caused by deceleration of the electric compressor 143. That is according to the turbo controller 149 of the first embodiment, it is possible to prevent the turbocharging amount of the turbocharging system 14 from rapidly decreasing.

Second Embodiment

Figure 7:
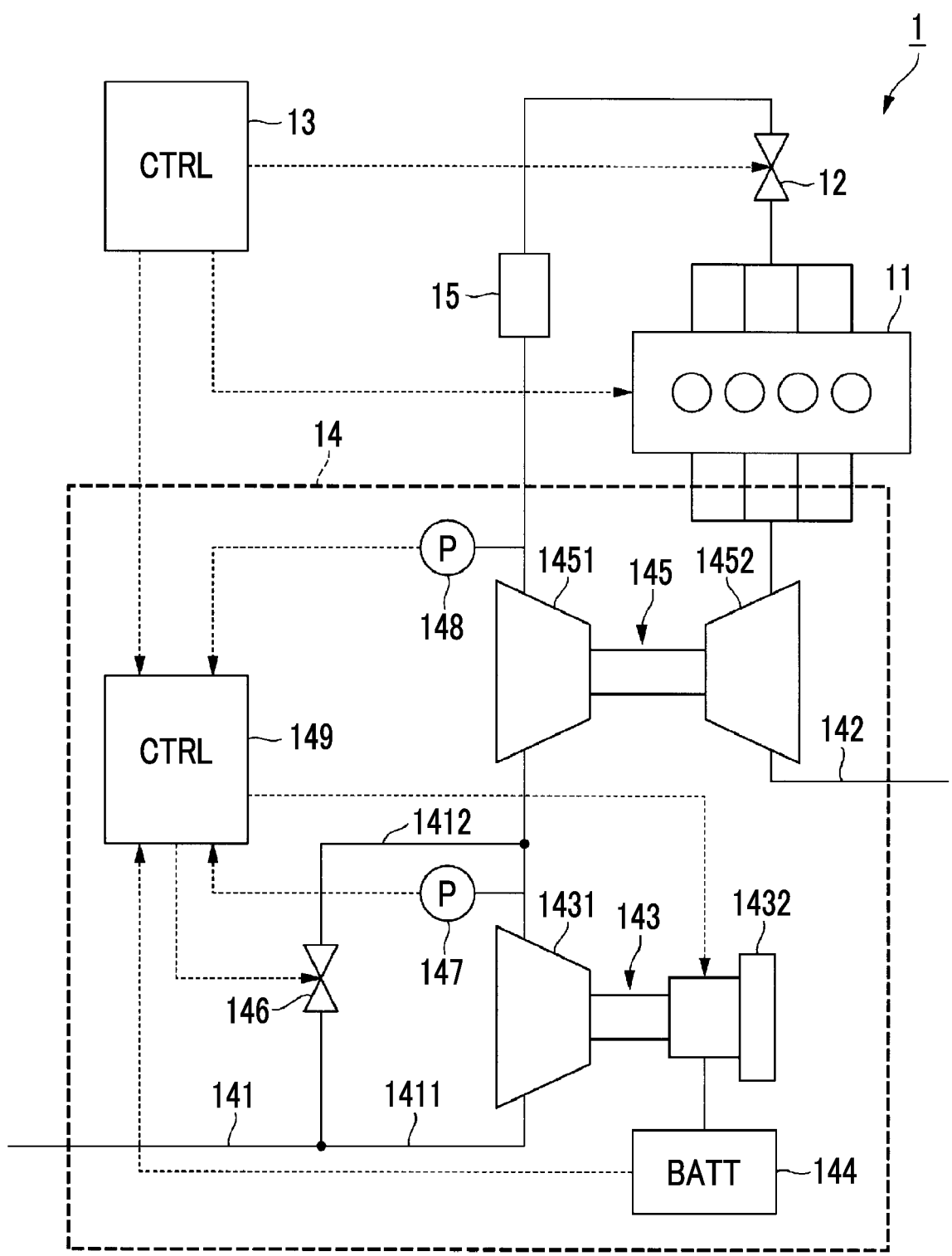
FIG. 7 is a schematic configuration diagram of an engine system according to a second embodiment.

FIG. 7 is a schematic configuration diagram of an engine system according to a second embodiment.

In an engine system of the second embodiment, operations of a battery 144 and a turbo controller 149 are different from those of the first embodiment. When a remaining capacity of the battery 144 is equal to or less than a predetermined capacity threshold Value, the battery 144 according to the second embodiment outputs an interrupt command requiring the stop of an electric motor 1432 to the turbo controller 149.

Figure 8:
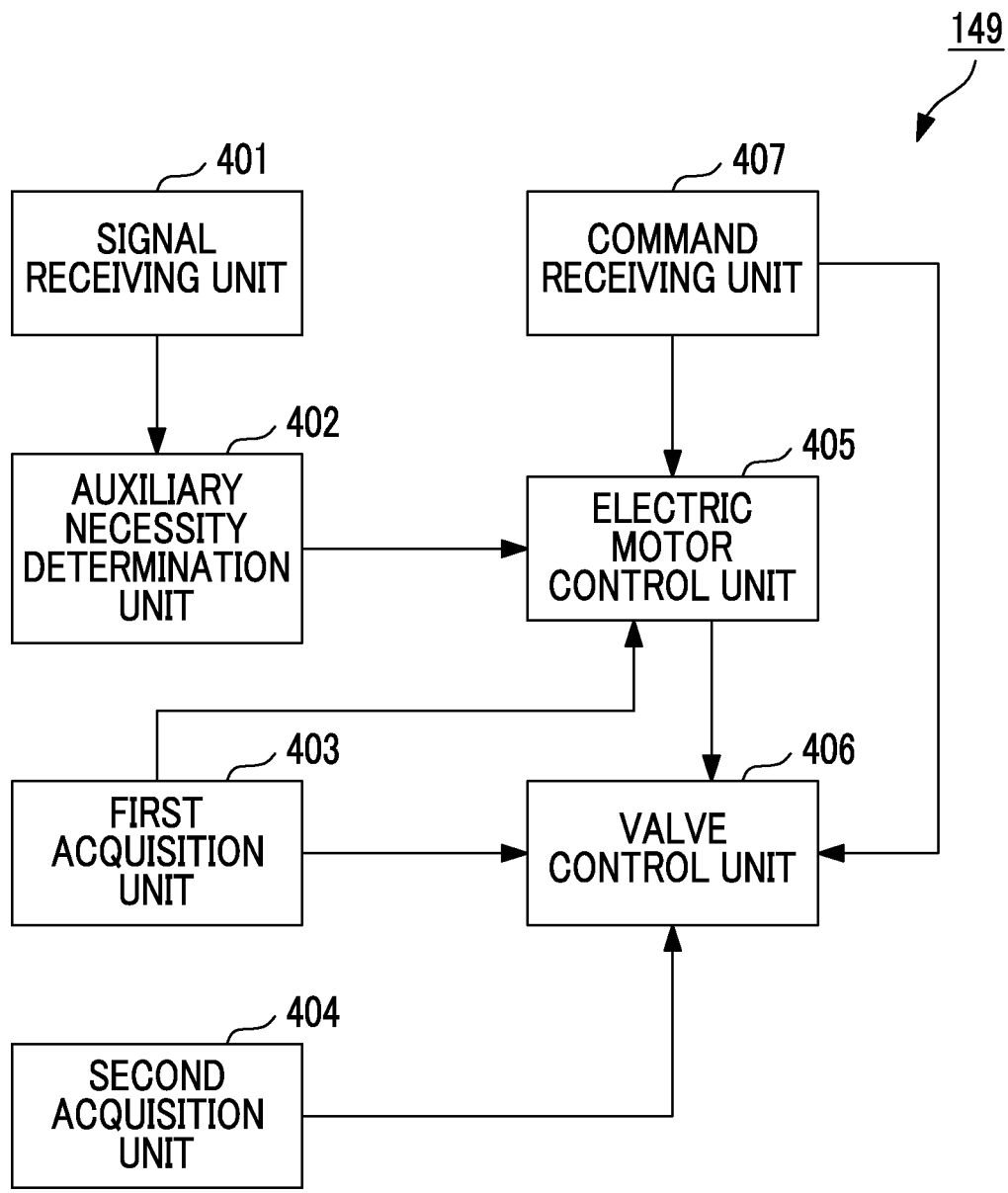
FIG. 8 is a schematic block diagram showing a software configuration of a turbo controller according to the second embodiment.

FIG. 8 is a schematic block diagram showing a software configuration of the turbo controller according to the second embodiment.

The turbo controller 149 according to the second embodiment. includes a command receiving unit 407 in addition to the configurations according to the first embodiment. The command receiving unit 407 receives an input of the interrupt command requiring the stop of the electric motor 1432 from the battery 144.

Based on a turbocharging control signal received by a signal receiving unit 401, a sensor signal acquired by a second acquisition unit 404, and the interrupt. command received by the command receiving unit 407, an electric motor control unit 405 according to the second embodiment controls a rotation speed of the electric motor 1432. Based on a sensor signal acquired by a first acquisition unit 403 and the interrupt command received by the command receiving unit 407, a valve control unit 406 according to the second embodiment controls an opening degree of a bypass valve 146.

Figure 9:
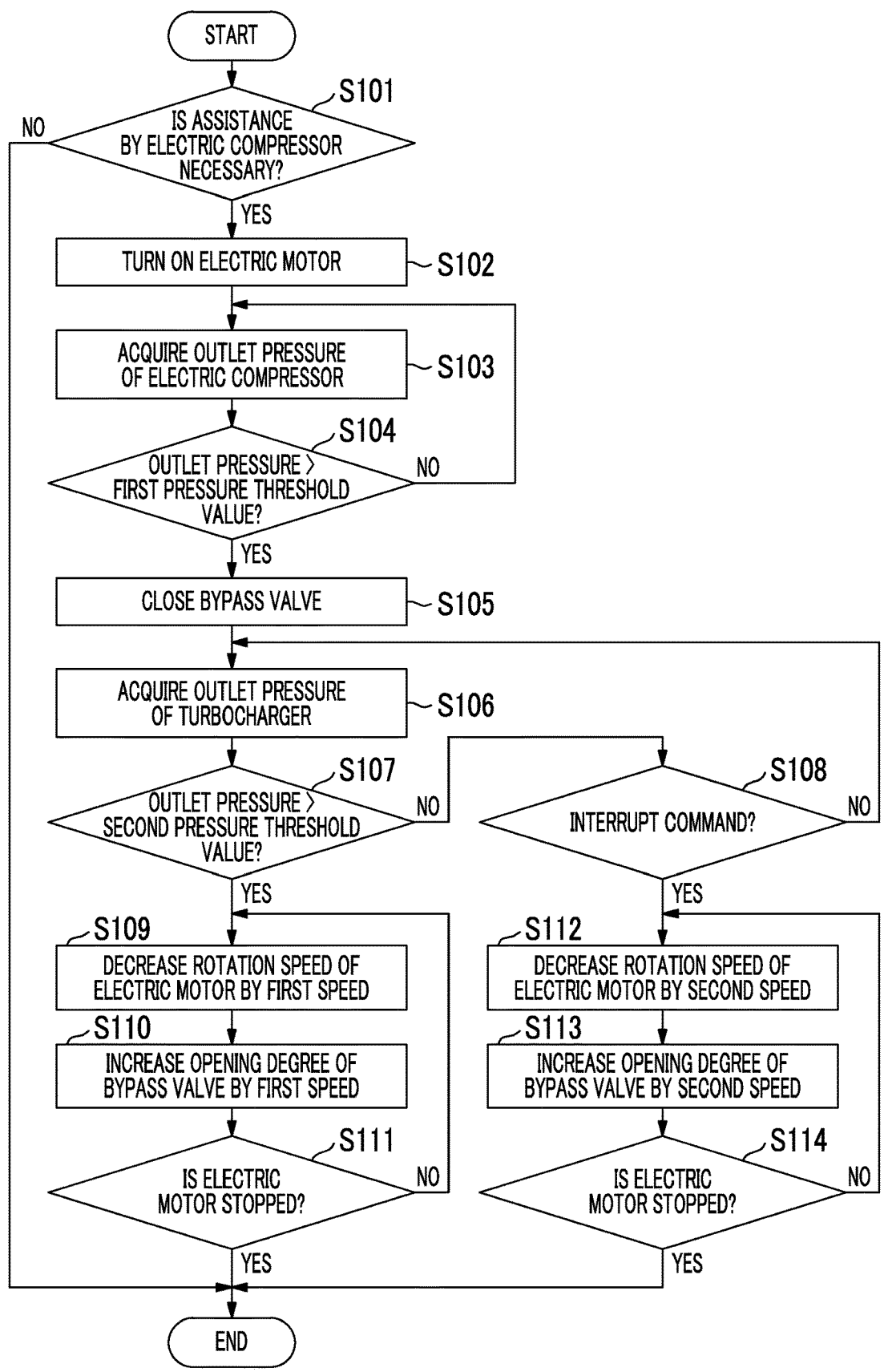
FIG. 9 is a flowchart showing a control operation of an electric compressor by the turbo controller according to the second embodiment.

FIG. 9 is a flowchart showing a control operation of the electric compressor by the turbo controller according to the second embodiment.

If the signal receiving unit 401 of the turbo controller 149 receives a turbocharging control signal from an engine controller 13, based on an exhaust amount and a target turbocharging amount of an engine 11 included in the turbocharging control signal, an auxiliary necessity determination unit 402 determines whether or not an. assistance by an electric compressor 143 is necessary (Step S101). In a case Where the auxiliary necessity determination unit 402 determines that the assistance by the electric compressor 143 is not necessary (Step S101: NO) the turbo controller 149 completes the processing without driving the electric compressor 143.

Meanwhile, in a case where the auxiliary necessity determination unit 402 determines that the assistance by the electric compressor 143 is necessary (Step S101: YES), the electric motor control unit 405 starts supply of electricity from the battery 144 to the electric motor 1432. Accordingly, the electric motor 1432 starts (Step S102). The first acquisition unit 403 acquires a sensor signal indicating an outlet pressure of the electric compressor 143 from a first pressure Sensor 147 (Step S103). The valve control unit 406 determines whether or not the outlet pressure indicated by the sensor signal acquired by the first acquisition unit 403 exceeds a first pressure threshold value (Step S104). In a case where the outlet pressure of the electric compressor 143 is equal to or less than the first pressure threshold value (Step S104: NO), the turbo controller 149 returns the processing to Step S103, and thus, the sensor signal is acquired again.

Meanwhile, in a case where the outlet pressure of the electric compressor 143 exceeds the first pressure threshold value (Step S104: YES), the valve control unit 406 closes the bypass valve 146 (Step S105). If the electric compressor 143 starts an assistance in compression of an intake air, the second acquisition unit 404 acquires a sensor signal indicating an outlet pressure of a turbocharger 145 from a second pressure Sensor 148 (Step S106). The electric motor control unit 405 determines whether or not the outlet pressure indicated by the sensor signal acquired by the second acquisition unit 404 exceeds a second pressure threshold value (Step S107). In a case where the outlet pressure of the turbocharger 145 is equal to or less than the second pressure threshold value (Step S107: NO), the command receiving unit 407 determines whether or not the interrupt command is received from the battery 144 (Step S108). In a case where the interrupt command is received from the battery 144 (Step S108: NO), the turbo controller 149 returns the processing to Step S105, and thus, the sensor signal acquired again.

Meanwhile, in a case where the outlet pressure of the turbocharger 145 exceeds the second pressure threshold value (Step S107: YES), the electric motor control unit 405 decreases the rotation speed of the electric motor 1432 according to a first change rate (Step S109). The valve control unit 406 increases the opening degree of the bypass valve 146 according to the first change rate (Step S110). For example, in a case where the first change rate is 5%, the electric motor control unit 405 decreases the rotation speed by 5% with respect to the target rotation speed of the electric motor 1432 under the control of Step S102, and the valve control unit 406 increases the opening degree of the bypass valve 146 by 5%. The first change rate is a change rate at which influences of a resistance by deceleration of the electric compressor 143 are sufficiently decreased. The electric motor control unit 405 determines whether or not the electric motor 1432 is stopped (Step S111). In a case where the electric motor 1432 is not stopped (Step S111: NO), the turbo controller 149 returns the processing to Step S109 so as to decrease the rotation speed of the electric motor 1432 and increase the opening degree of the bypass valve 146. In a case where the electric motor 1432 is stopped (Step S111: YES), the turbo controller 149 completes the control operation of the electric compressor 143.

Meanwhile, in a case where the interrupt command is received from the battery 144 (Step S108: YES), the electric motor control unit 405 decreases the rotation speed of the electric motor 1432 according to a second change rate (Step S112). The valve control unit 406 increases the opening degree of the bypass valve 146 according to a second change rate (Step S113). The second change rate is a change rate which is larger than the first change rate. The electric motor control unit 005 determines whether or not the electric motor 1432 is stopped (Step S114). In a case where the electric motor 1432 is not stopped (Step S114: NO), the turbo controller 149 returns the processing to Step S112 so as to decrease the rotation speed of the electric motor 1432 and increase the opening degree of the bypass valve 146. In a case where the electric motor 1432 is stopped (Step S114: YES), the turbo controller 149 completes the control operation of the electric compressor 143.

A time from Step S112 to the stop of the electric motor 1432 by repetition processing of Step S114 is shorter than a time from Step S109 to the stop of the electric motor 1432 by repetition processing of Step S111. Therefore, according to the second embodiment, the turbo controller 149 promptly stops the electric compressor 143 in the case of receiving the interrupt. command from the battery 144, and in the case where the outlet pressure of the turbocharger 145 exceeds the second pressure threshold value, the turbo controller 149 gradually stops the electric compressor 143. Accordingly, the turbo controller 149 according to the second embodiment can promptly prevent a capacity of the battery 144 from decreasing in a case where a remaining capacity of the battery 144 decreases due to a use of an air conditioner or the like. Meanwhile, the turbo controller 149 according to the second embodiment can prevent the turbocharging amount of the turbocharging system 14 from suddenly decreasing in a case where there is a margin in the remaining capacity of the battery 144.

In the second embodiment, based on the interrupt command from the battery 144, the turbo controller 149 changes the stop speed of the electric compressor 143 and the opening speed of the bypass valve 146. However, the present invention is not limited thereto. For example, based on the interrupt command from the battery 144, a turbo controller 149 of other embodiments may change a starting speed of the electric compressor 142 and a closing speed of the bypass valve 146.

Third Embodiment

Figure 10:
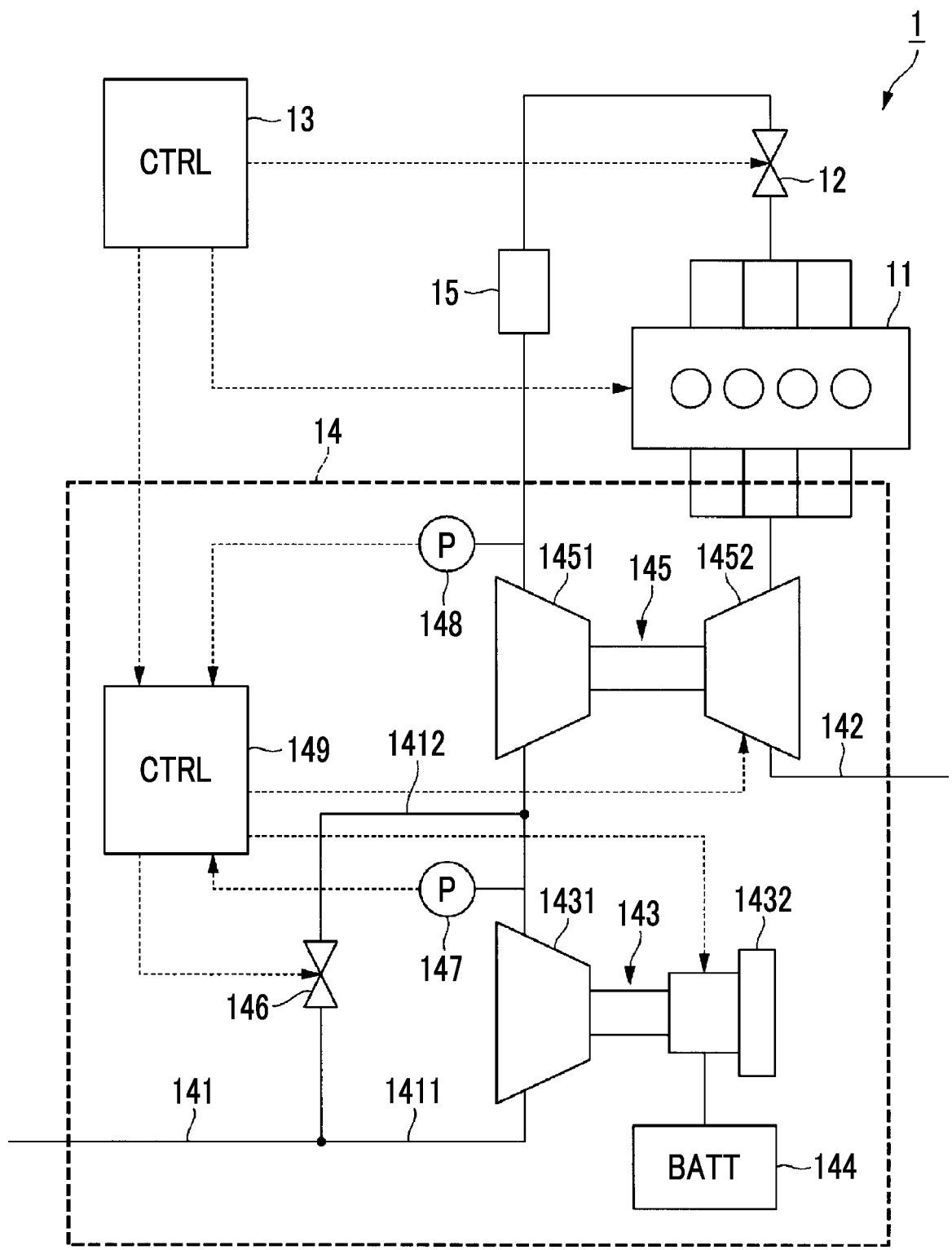
FIG. 10 is a schematic configuration diagram of an engine system according to a third embodiment.

FIG. 10 is a schematic configuration diagram of an engine system according to a third embodiment.

In an engine system 1 of the third embodiment, operations of a turbine 1452 and a turbo controller 149 are different from those of the first embodiment. The turbine 1452 according to the third embodiment is Variable Geometry Turbo (VGT). That is, a nozzle vane of the turbine 1452 according to the third embodiment is configured to be openable and closable, and an actuator (not shown) provided in the turbine 1452 is driven to control an opening degree of the nozzle vane.

Figure 11:
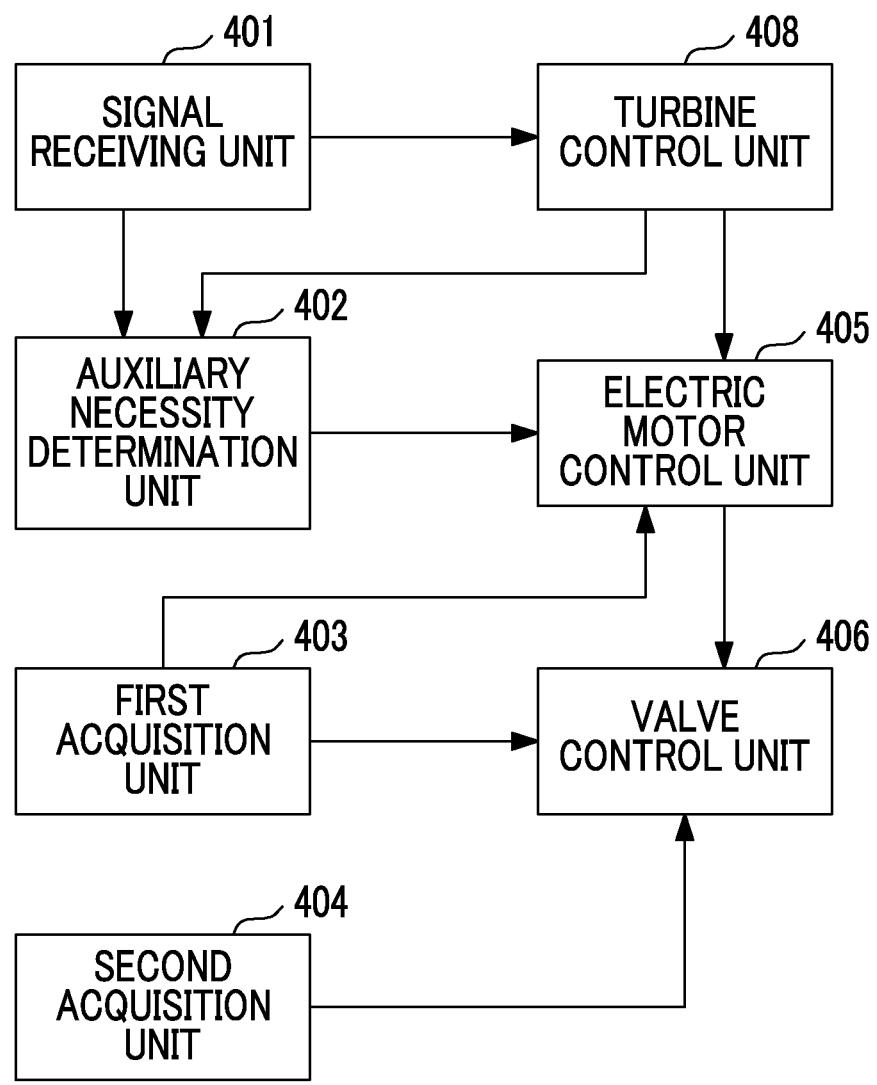
FIG. 11 is schematic block diagram showing a software configuration of a turbo controller according to the third embodiment.

FIG. 11 is a schematic block diagram showing a software configuration of the turbo controller according to the third embodiment.

A turbo controller 149 according to the third embodiment includes a turbine control unit 408 in addition to the configurations according to the first embodiment. Based on a turbocharging control signal received by signal receiving unit 401, the turbine control unit 408 controls opening or closing of a nozzle vane of the turbine 1452.

In addition to a case where a turbocharging amount predicted based on an exhaust amount is less than a target turbocharging amount, also in a case where the nozzle vane of the turbine 1452 closed, an auxiliary necessity determination unit 402 according to the third embodiment determines that an assistance by an electric compressor 143 is necessary. That is, an electric motor control unit 405 according to the third embodiment starts an electric motor 1432 when the turbine control unit 408 closes the nozzle vane of the turbine 1452.

If the nozzle vane of the turbine 1452 is closed, a flow of exhaust. air in an exhaust flow path 142 is obstructed and an exhaust air pressure increases, and thus, the turbocharging amount easily increases. Meanwhile, if the nozzle vane of the turbine 1452 is closed, an intake air flow rate decreases, and thus, there is possibility that torque of an engine 11 may decrease immediately after the nozzle vane is closed. On the other hand, according to the third embodiment, the turbo controller 149 closes the nozzle vane and starts the electric motor 1432, and thus, it is possible to increase an increasing speed of a rotation speed of a turbocharger 145 and secure the intake air flow rate.

Other Embodiments

Hereinbefore, several embodiments are described above in detail with reference to the drawings. However, specific configurations are not limited to those described above, and various design changes or the like can be made.

For example, in the above-described embodiments, based on the outlet pressure of the electric compressor 143, the valve control 406 controls the opening degree of the bypass valve 146. However, the present invention is not limited to this. For example, based on other physical quantities relating to a rotation speed or torque of an electric compressor 143 or a rotation of the electric compressor 143, a valve control unit 406 according to another embodiment may control an opening degree of a bypass valve 146. Still another embodiment, based on an elapsed time from start of an electric motor 1432, a valve control unit 406 may control an opening degree of a bypass valve 146. For example, the valve control unit 406 may close the bypass valve 146 when 0.1 seconds are elapsed after an electric motor control unit 405 starts the electric motor 1432.

In the above described embodiments, based on the outlet pressure of the turbocharger 145, the electric motor control unit 405 controls the rotation speed of the electric motor 1432. However, the present invention is not limited thereto. For example, based on other physical quantities relating to a rotation speed or torque of a turbocharger 145 or a rotation of the turbocharger 145, an electric motor control unit 405 according to still another embodiment may control a rotation speed of an electric motor 1432.

Figure 12:
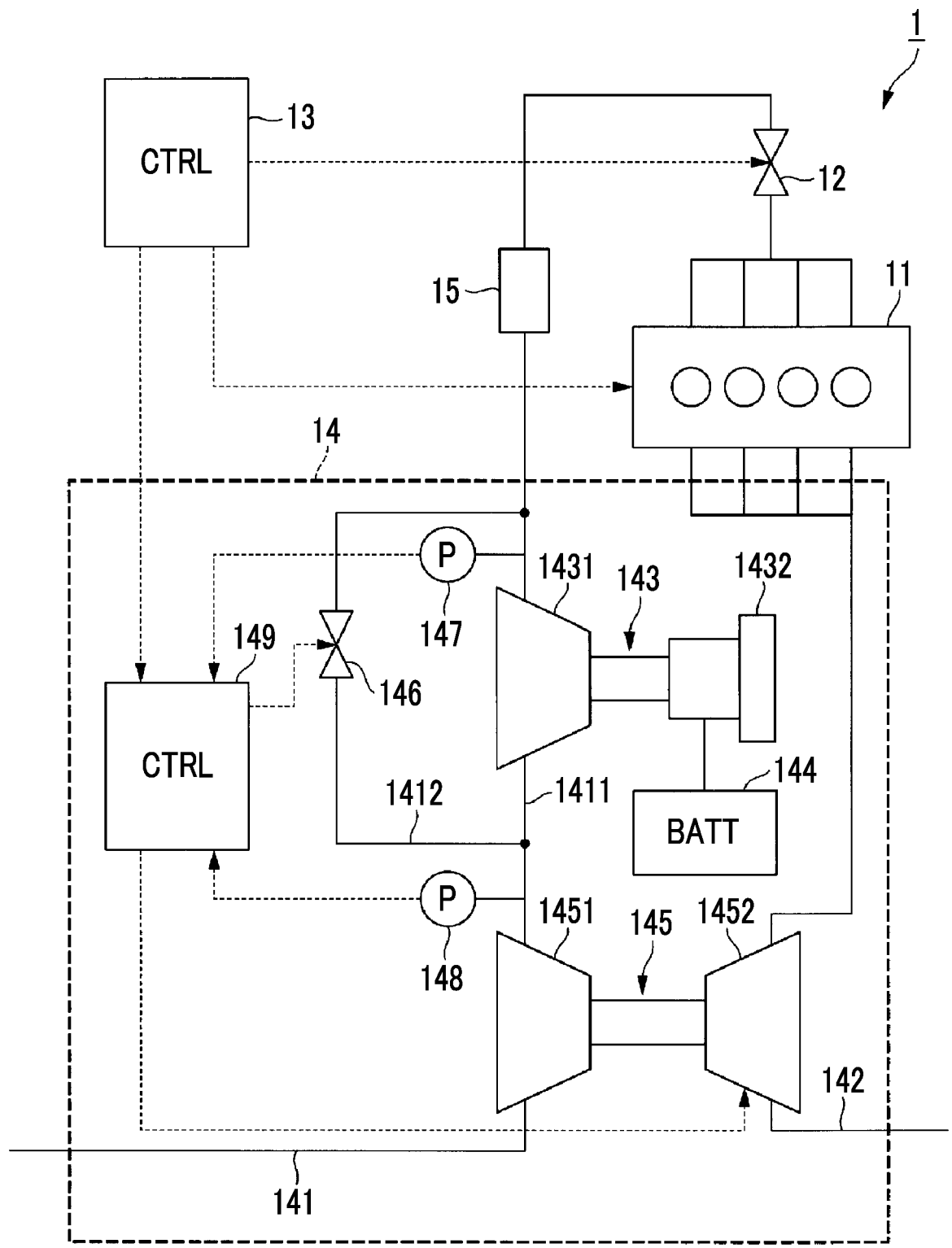
FIG. 12 is a schematic configuration diagram showing a modification example of the engine system according to the embodiment.

FIG. 12 is a schematic configuration diagram showing a modification example of the engine system according to the embodiments.

In the above-described embodiments, as shown in FIGS. 1, 7, and 10, the electric compressor 143 is provided at a front stage of the turbocharger 145. However, the present invention is not limited thereto. For example, in still another embodiment, as shown in FIG. 12, even when a turbocharger 145 is provided at a front stage of an electric compressor 143, a turbo controller 149 can exert effects similar to those of the above-described embodiments.

In the above-described embodiments, the turbo controller 149 and the engine controller 13 are individually provided. However, the present invention is not limited thereto. For example, still another embodiment, an engine controller 13 may include a function of a turbo controller 149.

<Computer Configuration>

Figure 13:
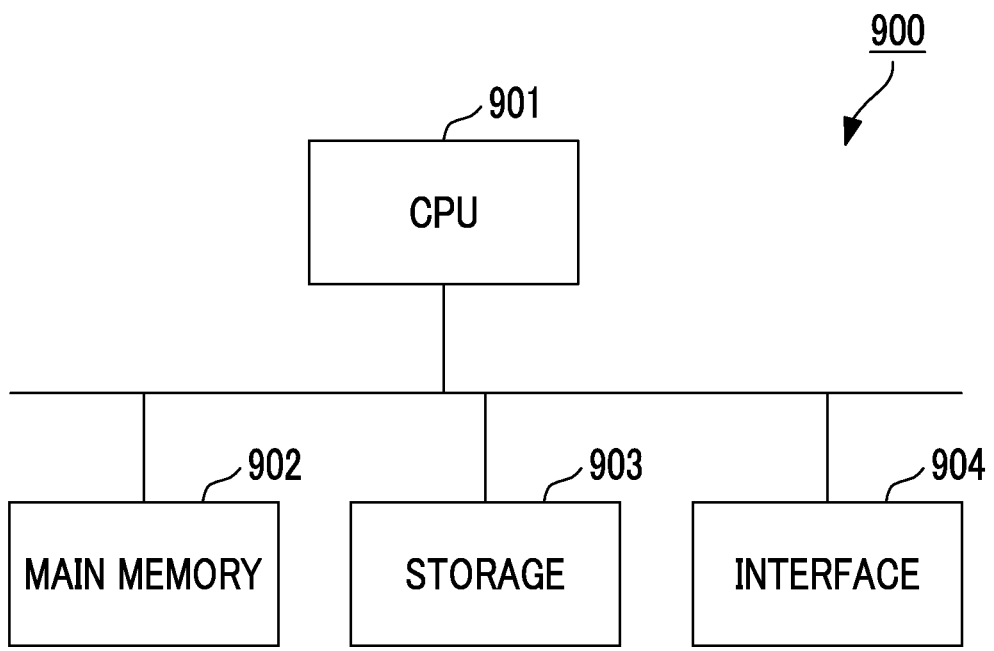
FIG. 13 is a schematic block diagram showing a configuration of a computer according to at least one embodiment.

FIG. 13 is schematic block diagram showing a configuration. of a computer according to at least one embodiment.

A computer 900 includes. a CPU 901, a main memory 902, a storage 903, and an interface 904.

The above-described turbo controller 149 is installed in the computer 900. In addition, the above-described operations of the respective processing units are stored in the storage 903 in the form of a program. The CPU 901 reads the program. from the storage 903, develops the program in the main memory 902, and executes the processing according to the program.

In at least one embodiment, the storage 903 is an example of non-transitory tangible medium. Other examples of the non-transitory tangible media include a magnetic disk, a magneto-optical disk, an optical disk, a semiconductor memory or the like connected via an interface 904. In a case where the program is distributed to the computer 900 via a communication line, the distributed computer 900 may develop the program in the main memory 902 and execute the process.

The program may be provided to realize a portion of the above-mentioned functions. The program mar be a so-called difference file (difference program) which realizes the above-described functions by a combination with other programs already stored in the storage 903.

INDUSTRIAL APPLICABILITY

According to the control device of the turbocharging system, the on-off valve is switched from the open state the closed state after the electric motor starts. Accordingly, when air flowing through the air supply flow path passes through the second compressor, the second compressor is rotated in advance, and thus, the control device can prevent the supply air pressure of the turbocharging system from decreasing.

REFERENCE SIGNS LIST

1: engine system
11: engine
14: turbocharging system
141: intake flow path
1411: main intake flow path
1412: bypass flow path
142: exhaust flow path
143: electric compressor
1431: compressor
1432: electric motor
144: battery
145: turbocharger
1451: compressor
1452: turbine
146: bypass valve
147: first pressure sensor
148: second pressure sensor
149: turbo controller
401: signal receiving unit 402: auxiliary necessity determination unit
403: first acquisition unit
404: second acquisition unit
405: electric motor control unit
406: valve control unit
407: command receiving unit
408: turbine control unit

The invention claimed is:

1. A control device for a turbocharging system including
a first compressor which is provided in an intake flow path through which intake air supplied to an engine flows and is driven to compress the intake air,
an electric motor which drives the first compressor,
a second compressor which is provided in the intake flow path and compresses the intake air,
a turbine which is provided in an exhaust system through which exhaust air from the engine flows and is rotated by the exhaust air so as to drive the second compressor,
a bypass flow path which is connected to the intake flow path and bypasses the first compressor, and
an on-off valve which opens or closes the bypass flow path,
the control device comprising:
an electric motor control unit which starts the electric motor;
a valve control unit which switches the on-off valve from an open state to a closed state after the electric motor is started by the electric motor control unit; and
a second acquisition unit which acquires a physical quantity relating to a rotation of the second compressor;
wherein the electric motor control unit stops the electric motor in a case where the physical quantity acquired by the second acquisition unit exceeds a predetermined threshold value,
wherein the valve control unit switches the on-off valve from the closed state to the open state with a transition time set in conjunction with a rotation speed of the electric motor, and
wherein the valve control unit increases an opening degree of the on-off valve by an opening degree corresponding to a decrease of the rotation speed with respect to the target rotation speed of the electric motor.

2. The control device for a turbocharging system according to claim 1, further comprising:
a first acquisition unit which acquires a physical quantity relating to a rotation of the first compressor,
wherein the valve control unit switches the on-off valve from the open state to the closed state after the electric motor starts and in a case where the physical quantity acquired by the first acquisition unit exceeds a predetermined threshold value.

3. The control device for a turbocharging system according to claim 1, further comprising:
a command receiving unit which receives an interrupt command for stopping the electric motor,
wherein the electric motor control unit stops the electric motor in a case where the command receiving unit receives the interrupt command, and
wherein a time from when a stop of the electric motor starts until the electric motor stops based on the interrupt command is shorter than a time from when the stop of the electric motor starts until the electric motor stops based on the physical quantity.

4. The control device for a turbocharging system according to claim 1,
wherein the turbine is configured to be able to open or close a nozzle vane,
wherein a turbine control unit which controls opening or closing of the nozzle vane is further provided, and
wherein the electric motor control unit starts the electric motor when the turbine control unit closes the nozzle vane.

5. A turbocharging system comprising:
a first compressor which is provided in an intake flow path through which intake air supplied to an engine flows and is driven to compress the intake air;
an electric motor which drives the first compressor;
a second compressor which is provided in the intake flow path and compresses the intake air;
a turbine which is provided in an exhaust system through which exhaust air from the engine flows and is rotated by the exhaust air so as to drive the second compressor;
a bypass flow path which is connected to the intake flow path and bypasses the first compressor;
an on-off valve which opens or closes the bypass flow path; and
the control device according to claim 1.

6. An engine system comprising:
an engine; and
the turbocharging system according to claim 5.

7. The control device for a turbocharging system according to claim 2,
wherein the turbine is configured to be able to open or close a nozzle vane,
wherein a turbine control unit which controls opening or closing of the nozzle vane is further provided, and
wherein the electric motor control unit starts the electric motor when the turbine control unit closes the nozzle vane.

8. The control device for a turbocharging system according to claim 3,
wherein the turbine is configured to be able to open or close a nozzle vane,
wherein a turbine control unit which controls opening or closing of the nozzle vane is further provided, and
wherein the electric motor control unit starts the electric motor when the turbine control unit closes the nozzle vane.

9. A turbocharging system comprising:
a first compressor which is provided in an intake flow path through which intake air supplied to an engine flows and is driven to compress the intake air;
an electric motor which drives the first compressor;
a second compressor which is provided in the intake flow path and compresses the intake air;
a turbine which is provided in an exhaust system through which exhaust air from the engine flows and is rotated by the exhaust air so as to drive the second compressor;
a bypass flow path which is connected to the intake flow path and bypasses the first compressor;
an on-off valve which opens or closes the bypass flow path; and
the control device according to claim 2.

10. A turbocharging system comprising:
a first compressor which is provided in an intake flow path through which intake air supplied to an engine flows and is driven to compress the intake air;
an electric motor which drives the first compressor;
a second compressor which is provided in the intake flow path and compresses the intake air;
a turbine which is provided in an exhaust system through which exhaust air from the engine flows and is rotated by the exhaust air so as to drive the second compressor;

a bypass flow path which is connected to the intake flow path and bypasses the first compressor;
an on-off valve which opens or closes the bypass flow path; and
the control device according to claim 3.

11. A turbocharging system comprising:
a first compressor which is provided in an intake flow path through which intake air supplied to an engine flows and is driven to compress the intake air;
an electric motor which drives the first compressor;
a second compressor which is provided in the intake flow and compresses the intake air;
a turbine which is provided in an exhaust system through which exhaust air from the engine flows and is rotated by the exhaust air so as to drive the second compressor;
a bypass flow path which is connected to the intake flow path and bypasses the first compressor;
an on-off valve which opens or closes the bypass flow path; and
the control device according to claim 4.

12. The control device for a turbocharging system according to claim 3, further comprising:
a battery which supplies electricity to the motor,
wherein the electric motor control unit outputs the interrupt command requiring the stop of the electric motor when a remaining capacity of the battery is equal to or less than a predetermined capacity threshold value.

13. A control method for a turbocharging system including
a first compressor which is provided in an intake flow path through which intake air supplied to an engine flows and is driven to compress the intake air,
an electric motor which drives the first compressor,
a second compressor which is provided in the intake flow path and compresses the intake air,
a turbine which is provided in an exhaust system through which exhaust air from the engine flows and is rotated by the exhaust air so as to drive the second compressor,
a bypass flow path which is connected to the intake flow path and bypasses the first compressor, and
an on-off valve which opens or closes the bypass flow path,
the control method comprising:
starting the electric motor;
switching the on-off valve from an open state to a closed state after the electric motor starts;
stopping the electric motor in a case where the physical quantity relating to a rotation of the second compressor exceeds a predetermined threshold value;
switching the on-off valve from the closed state to the open state with a transition time set in conjunction with a rotation speed of the electric motor; and
increasing an opening degree of the on-off valve by an opening degree corresponding to a decrease of the rotation speed with respect to the target rotation speed of the electric motor.

14. A program for causing a computer of a control device for a turbocharging system including
a first compressor which is provided in an intake flow path through which intake air supplied to an engine flows and is driven to compress the intake air,
an electric motor which drives the first compressor,
a second compressor which is provided in the intake flow path and compresses the intake air,
a turbine which is provided in an exhaust system through which exhaust air from the engine flows and is rotated by the exhaust air so as to drive the second compressor,
a bypass flow path which is connected to the intake flow path and bypasses the first compressor, and
an on-off valve which opens or closes the bypass flow path, to execute:
starting the electric motor;
switching the on-off valve from an open state to a closed state after the electric motor starts;
stopping the electric motor in a case where the physical quantity relating to a rotation of the second compressor exceeds a predetermined threshold value;
switching the on-off valve from the closed state to the open state with a transition time set in conjunction with a rotation speed of the electric motor; and
increasing an opening degree of the on-off valve by an opening degree corresponding to a decrease of the rotation speed with respect to the target rotation speed of the electric motor.

* * * * *